US008842920B1

(12) United States Patent
Ioffe (10) Patent No.: US 8,842,920 B1
(45) Date of Patent: Sep. 23, 2014

(54) SYSTEMS AND METHODS FOR FACILITATING CROP-INVARIANT VIDEO FINGERPRINTING USING WAVELET TRANSFORMS

(75) Inventor: Sergey Ioffe, Mountain View, CA (US)

(73) Assignee: Google Inc., Mountain View, CA (US)

( * ) Notice: Subject to any disclaimer, the term of this patent is extended or adjusted under 35 U.S.C. 154(b) by 260 days.

(21) Appl. No.: 13/434,838

(22) Filed: Mar. 29, 2012

(51) Int. Cl.
*G06K 9/00* (2006.01)
(52) U.S. Cl.
USPC .......................................... 382/232; 382/100
(58) Field of Classification Search
None
See application file for complete search history.

(56) References Cited

U.S. PATENT DOCUMENTS

| 8,094,872 | B1 | 1/2012 | Yagnik et al. | |
| 2004/0028281 | A1* | 2/2004 | Cheng et al. | 382/232 |

OTHER PUBLICATIONS

Lu, Jian, "Video Fingerprinting and Applications: a review," Media Forensics & Security Conference, Vobile, Inc., San Jose, CA, http://www.slideshare.net/jianlu/videofingerprintingspiemfs09d, Last accessed May 30, 2012.
Media Hedge, "Digital Fingerprinting," White Paper, Civolution and Gracenote, 2010, http://www.civolution.com/fileadmin/bestanden/white%20papers/Fingerprinting%20-%20by%20Civolution%20and%20Gracenote%20-%202010.pdf, Last accessed May 30, 2012.
Milano, Dominic, "Content Control: Digital Watermarking and Fingerprinting," White Paper, Rhozet, a business unit of Harmonic Inc., http://www.rhozet.com/whitepapers/Fingerprinting_Watermarking.pdf, Last accessed May 30, 2012.
Lu, Jian, "Video fingerprinting for copy identification: from research to industry applications," Proceedings of SPIE—Media Forensics and Security XI, vol. 7254, Jan. 2009, http://idm.pku.edu.cn/jiaoxue-MMF/2009/VideoFingerprinting_SPIE-MFS09.pdf, Last accessed May 30, 2012.
"Altnet Launches Global File Registry," P2P File Sharing, http://www.p2p-weblog.com/50226711/altnet_launches_global_file_registry.php, Last accessed Jun. 19, 2012.

* cited by examiner

*Primary Examiner* — Hadi Akhavannik
(74) *Attorney, Agent, or Firm* — Amin, Turocy & Watson, LLP (57) ABSTRACT

Systems and methods for facilitating video fingerprinting are provided. In one embodiment, a system can include: a memory, a microprocessor, a communication component that receives the media; and a media fingerprinting component that fingerprints the media. The media fingerprinting component employs a fingerprint generation component stored in the memory and includes: a wavelet transform generation component that computes a wavelet transform, and identifies a set of largest coefficients for, the frame information; a coefficient encoder component that encodes the largest coefficients by mapping the largest coefficients to a tuple of integers; an aggregation component that aggregates the tuples of integers, and records a count of the tuples. The MFC can also include: a weighted set generation component that generates a weighted set of the tuples of integers; and a hash generation component that generates a hash based on the weighted set of the tuples of integers.

33 Claims, 10 Drawing Sheets

SYSTEMS AND METHODS FOR FACILITATING CROP-INVARIANT VIDEO FINGERPRINTING USING WAVELET TRANSFORMS

TECHNICAL FIELD

This disclosure generally relates to crop-invariant fingerprinting using wavelet transforms.

BACKGROUND

Video processing methods employ video fingerprinting to identify near-duplicate videos, and/or portions thereof. Video fingerprinting can be also employed in identifying copyrighted material in a video and/or deduping. Unfortunately, conventional methods for generating fingerprints are typically complex and time-consuming. Further, the fingerprints generated by such methods can be sensitive to crops, scaling and/or flipped versions of the video rendering the generated fingerprint of limited utility. As such, systems and methods that provide new approaches for generating video fingerprints are desired.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its purpose is to present some concepts of one or more embodiments in a simplified form as a prelude to the more detailed description that is presented later.

In one or more embodiments, the disclosed subject matter relates to a system that performs video fingerprinting, comprising: a memory that stores computer executable components; and a microprocessor that executes computer executable components stored in the memory. The computer executable components can include: a communication component that receives the media. The components can also include a media fingerprinting component that fingerprints the media, the media fingerprinting component employing a fingerprint generation component (FGC) stored in the memory. The FGC can include: a wavelet transform generation component that: computes a first wavelet transform for frame information of the media; and identifies one or more largest coefficients for the frame information. The FGC can also include a coefficient encoder component that encodes one or more largest coefficients, wherein encoding comprises encoding the one or more largest coefficients by mapping the one or more largest coefficients to a tuple of integers. The FGC can also include an aggregation component that, for a selected time interval of a plurality of time intervals: aggregates the tuples of integers; and records a count of the tuples. The FGC can also include a weighted set generation component that generates a weighted set of the tuples of integers. The FGC can also include a hash generation component that generates a hash based, at least, on the weighted set of the tuples of integers.

In one or more embodiments, a method that performs video fingerprinting can include employing a microprocessor to execute computer executable components stored within a memory to perform the following: generating a fingerprint for media; computing a wavelet transform for frame information of the media; identifying one or more largest coefficients for the frame information; encoding one or more largest coefficients by mapping the one or more largest coefficients to a tuple of integers; and aggregating the tuples of integers for a selected time interval. The method can also include recording a count of the tuples for the selected time interval; generating a weighted set of the tuples of integers; and generating a hash based, at least, on the weighted set of the tuples of integers.

Toward the accomplishment of the foregoing and related ends, the one or more embodiments include the features hereinafter fully described and particularly pointed out in the claims. The following description and the annexed drawings set forth herein detail certain illustrative aspects of the one or more embodiments. These aspects are indicative, however, of but a few of the various ways in which the principles of various embodiments can be employed, and the described embodiments are intended to include all such aspects and their equivalents.

DETAILED DESCRIPTION

Various embodiments are now described with reference to the drawings, wherein like reference numerals are used to refer to like elements throughout. In the following description, for purposes of explanation, numerous specific details are set forth in order to provide a more thorough understanding of one or more embodiments. It is be evident, however, that such embodiments can be practiced without these specific details. In other instances, structures and devices are shown in block diagram form in order to facilitate describing one or more embodiments.

Systems and methods disclosed herein relate to generating crop-invariant video fingerprinting using wavelet transforms. In particular, a system can include a communication component that receives the media, and a media fingerprinting component that fingerprints the media. The media fingerprinting component can include an FGC stored in memory. The FGC can include: a wavelet transform generation component that: computes a first wavelet transform for frame information of the media; and identifies the largest coefficients for the frame information. The FGC can also include a coefficient encoder component that encodes the largest coefficients by mapping the largest coefficients to a tuple of integers. An aggregation component aggregates the tuples of integers, and records a count of the tuples. A weighted set generation component generates a weighted set of the tuples of integers. In some embodiments, the tuples of integers are weighted by the counts of the tuples. In other embodiments, the tuples are weighted by other factors including, but not limited to, a scale or magnitude of the largest coefficients of the wavelets, and/or a rank of the magnitude of the largest coefficients. A hash generation component generates a hash based on the weighted set of the tuples of integers. The fingerprint is then generated based on the hash. The systems and methods herein can enable identification of media (e.g., videos, images and/or audio) or portions thereof by providing fingerprinting that is robust to cropping, various changes in aspect ratio and/or other transformations.

Figure 1:
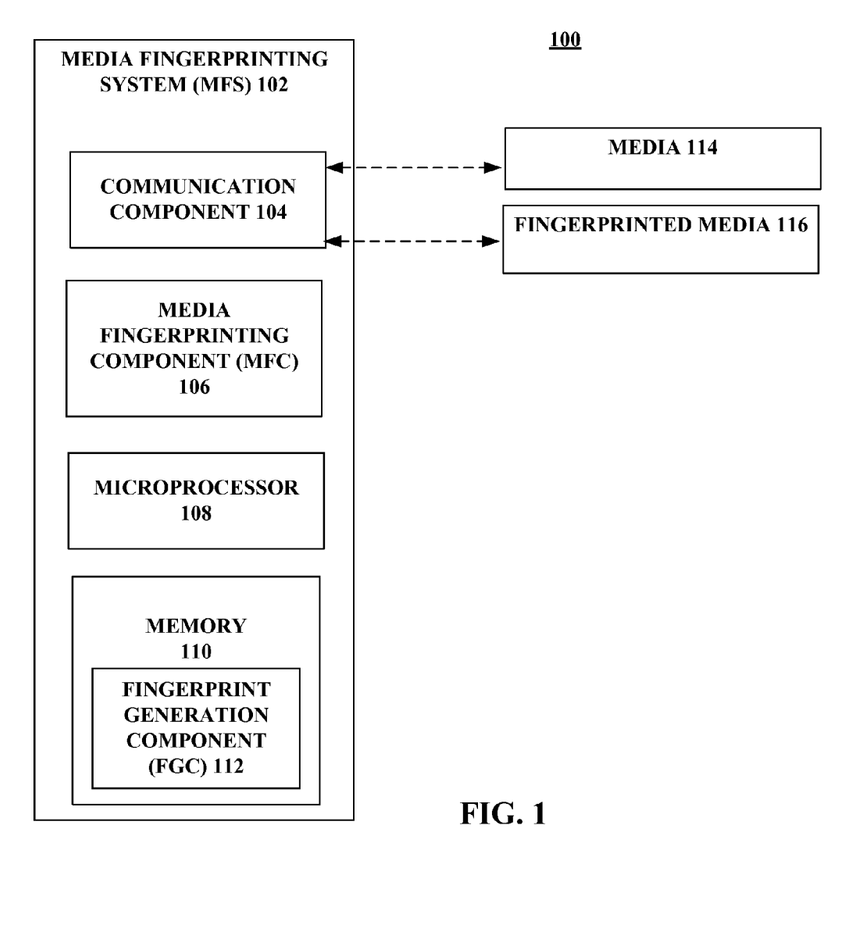
FIG. 1 is an illustration of a block diagram of an exemplary non-limiting media fingerprinting system that facilitates crop-invariant video fingerprinting using wavelet transforms in accordance with embodiments described herein.

FIG. 1 is an illustration of a block diagram of an exemplary non-limiting media fingerprinting system that facilitates crop-invariant video fingerprinting using wavelet transforms in accordance with embodiments described herein. The system (e.g., system 100) can include a media fingerprinting system (MFS) 102 that can include a communication component 104, a media fingerprinting component (MFC) 106, a microprocessor 108 and/or a memory 110. In some embodiments, system 100 can also include media 114 and/or fingerprinted media 116, e.g., stored in the memory 110 or a storage device (not shown). The communication component 104, MFC 106, microprocessor 108 and/or memory 110 can be electrically and/or communicatively coupled to one another to perform one or more functions of the system 100 described in this disclosure.

The communication component 104 can receive media 114 (e.g., video and/or image), or component thereof. The communication component 104 can also output fingerprinted media 116, as shown in FIG. 1. The fingerprinted media 116 can include, and/or be associated with, a fingerprint. In some embodiments, the communication component 104 can output a fingerprint for media 114. In various embodiments, the communication component 104 can access media stored at the memory 110 of the MFS 102 and/or stored at a location remote from the MFS 102. For example, the communication component 104 can access the media 114 over a network (not shown) including, but not limited to, the internet.

The MFC 106 can fingerprint the media with a generated fingerprint. In various embodiments, for example, the MFC 106 can employ the fingerprint generation component 112 stored in the memory 110 to generate the fingerprint with which the media (or a portion thereof) is fingerprinted.

In various embodiments, the fingerprint generation component (FGC) 112 can be configured to generate a fingerprint that is crop-invariant. The crop-invariant fingerprint can be generated based on wavelets in some embodiments. Aspects of the FGC 112 can be further understood with reference to FIG. 2.

Microprocessor 108 can perform one or more of the functions described in this disclosure with reference to any of the systems and/or methods disclosed.

The memory 110 can be a computer-readable storage medium storing computer-executable instructions and/or information for performing the functions described in this disclosure with reference to any of the systems and/or methods disclosed. For example, as shown, memory 110 can store computer-executable instructions in some embodiments, for performing the functions of the fingerprint generation component 112.

Figure 2:
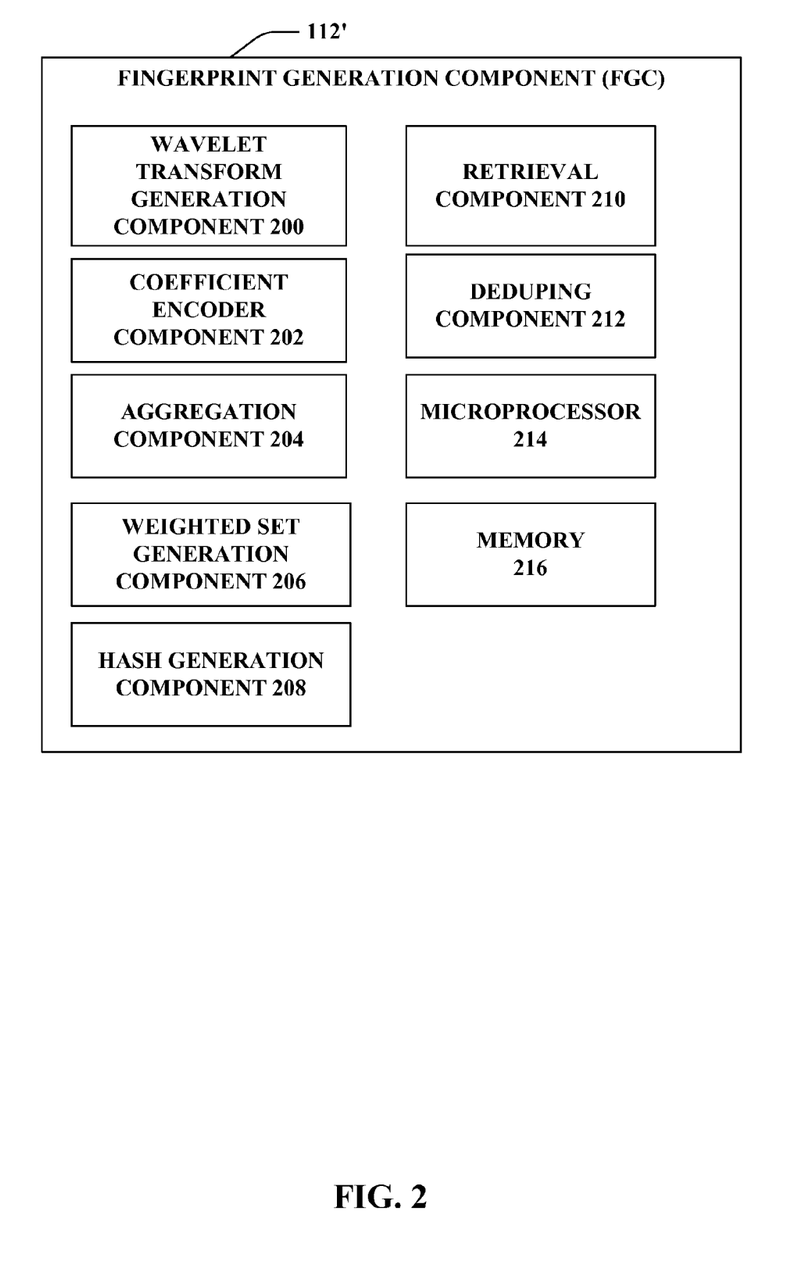
FIG. 2 is an illustration of a block diagram of an exemplary non-limiting fingerprint generation component that facilitates crop-invariant video fingerprinting using wavelet transforms in accordance with embodiments described herein.

FIG. 2 is an illustration of a block diagram of an exemplary non-limiting fingerprint generation component (FGC 112') that facilitates crop-invariant video fingerprinting using wavelet transforms in accordance with embodiments described herein. One or more of the structure and/or functions of the FGC 112 can be as described and/or shown with reference to the FGC 112' of FIG. 2.

As shown in FIG. 2, the FGC 112' can include a wavelet transform generation (WTG) component 200, a coefficient encoder component 202, an aggregation component 204, a weighted set generation (WSG) component 206, a hash generation component 208, a retrieval component 210, a deduping component 212, a microprocessor 214 and/or a memory 216. In various embodiments, one or more of the WTG component 200, coefficient encoder component 202, aggregation component 204, weighted set generation (WSG) component 206, hash generation component 208, retrieval component 210, deduping component 212, microprocessor 214 and/or memory 216 can be electrically and/or communicatively coupled to one another to perform one or more of the functions of FGC 112 and/or FGC 112'.

The FGC 112' can receive frame information for media. In various embodiments, the frame information can include information about the content of the corresponding frame of media. In some embodiments, the frame information can include information associated with the content of an average of two or more frames.

The WTG component 200 can generate (or compute) a wavelet transform for the media in the frame. The wavelet transform can be a haar wavelet transform in some embodiments.

However, the wavelet transform need not be a haar wavelet transform and can be any of a number of other types of wavelet transforms in various embodiments. By way of example, but not limitation, the wavelet transform can be an overcomplete wavelet transform or a three-dimensional wavelet transform.

In some embodiments, an overcomplete wavelet transform can be a wavelet transform in which a number of wavelet coefficients are four times or 16 times the number of pixels in the frame of the media. In embodiments in which the wavelet transform is not overcomplete, the number of wavelet coefficients can be equal to the number of pixels in the frame of the media. The three-dimensional wavelets can be wavelets having components that represent x, y and t (time) space.

The WTG component 200 can also identify coefficients for the frame information. For example, the WTG component 200 can identify wavelet coefficients for the frame information.

In some embodiments, the WTG component 200 can identify a selected number of the largest coefficients. In some embodiments, the number identified can be a design parameter and, as such, can be dynamic or static and/or can be pre-programmed in the FGC 112' and/or provided as an input to a system, e.g., system 100, that includes the FGC 112'.

In some embodiments, the largest coefficients can be identified as the largest coefficients over the frame. In some embodiments, the largest coefficients can be identified based on non-maximum suppression over local neighborhoods.

The coefficient encoder component 202 can encode one or more of the largest coefficients. In some embodiments, encoding the coefficients can include mapping the one or more largest coefficients to one or more values. In some embodiments, the coefficients can be mapped to a tuple of integers.

In some embodiments, the coefficient encoder component 202 can encode the relative positions of pairs of wavelet transforms generated by the wavelet transform generation component. In various embodiments, the coefficient encoder component 202 can encode the relative positions of pairs of wavelet transforms in addition to encoding the largest one or more coefficients by mapping the coefficients to a tuple of integers.

In some embodiments, the tuple of integers can represent one or more values. In some embodiments, the integers can represent a quantized x value and a quantized y value (in which the x and y values are quantized values representative of the positions of the magnitude of the coefficients for a wavelet), a sign value (e.g., +1 or −1), an x-scale value and/or a y-scale value.

In some embodiments, the values can be quantized up to a number of levels. For example, the values can be quantized to four levels in some embodiments. The values can be quantized up to four levels by using a 4×4 spatial grid in some embodiments.

Multiple quantizations can be employed such that one or more coefficients are mapped to multiple tuples. In some embodiments, for example, each coefficient can be mapped to multiple tuples.

In some embodiments, the coefficient encoder component 202 can encode groups of the largest coefficients (in lieu of encoding coefficients individually). For example, in some embodiments, coefficients that are sufficiently close to one another can be encoded as a pair by encoding, in addition to their individual coefficient information, their relative positions to one another. The relative position information that is encoded can be quantized also. The relative position information can be quantized more finely than the absolute position information described above since the relative positions of the coefficients may not change as much in response to cropping of the frame.

Figure 3:
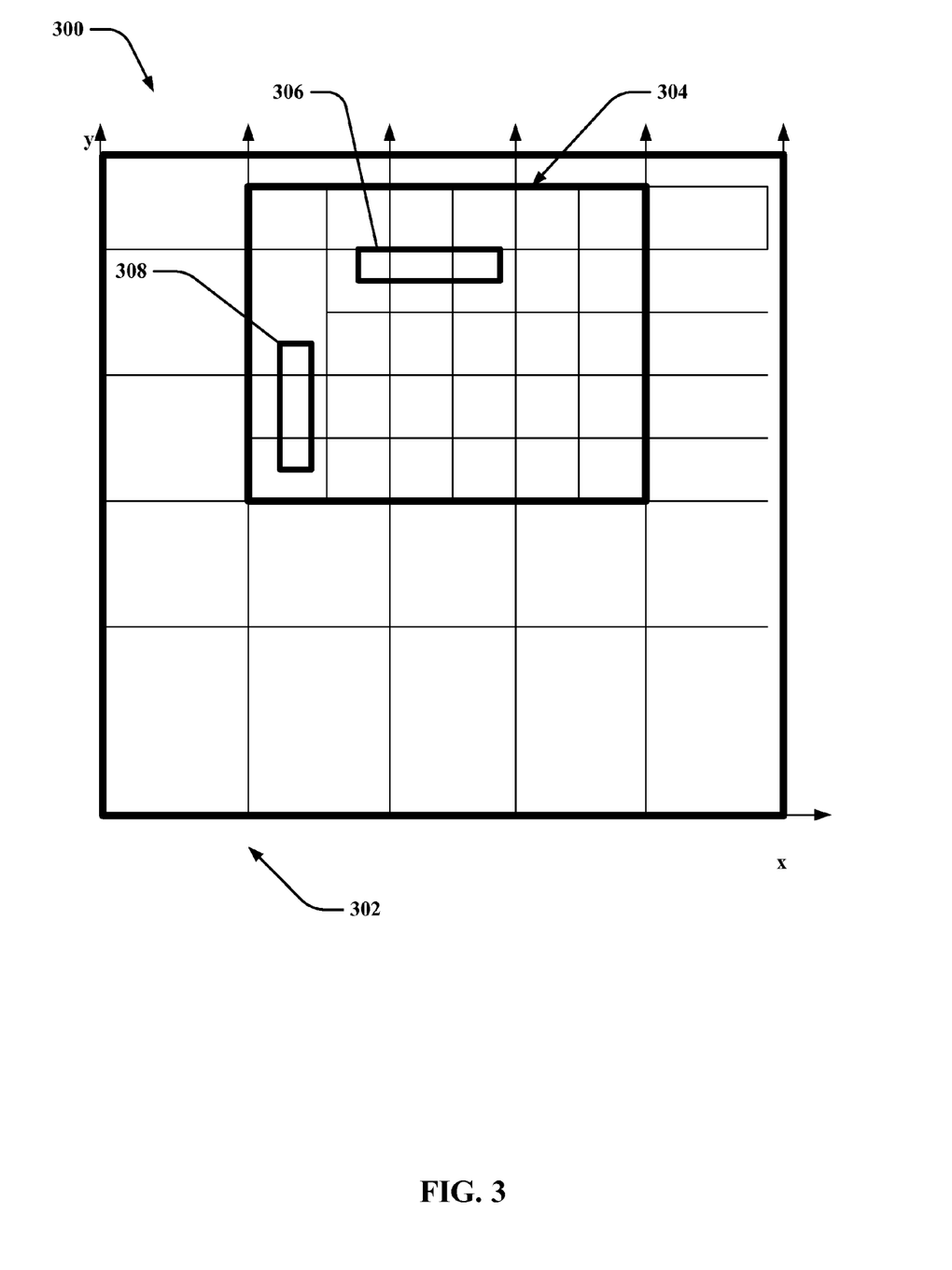
FIG. 3 is an illustration of a graph detailing the manner in which encoding of coefficients and relative positions of pairs of wavelet transforms can be employed to facilitate crop-invariant video fingerprinting using wavelet transforms in accordance with embodiments described herein.

Turning briefly to FIG. 3, FIG. 3 is an illustration of a graph 300 detailing the manner in which encoding of coefficients and relative positions of pairs of wavelet transforms can be employed to facilitate crop-invariant video fingerprinting using wavelet transforms in accordance with embodiments described herein.

FIG. 3 displays a first grid 302 for quantizing absolute positions associated with wavelet coefficients 306, 308 and a second grid 304 for quantizing relative positions associated with a pair of wavelets 306, 308. While a pair of wavelets 306, 308 are shown, in other embodiments, the relative position between any number of wavelets in a group of wavelets can be quantized and encoded.

The coefficient encoder component 202 can encode individual wavelet coefficients by quantizing the absolute position corresponding to the wavelet coefficient.

In some embodiments, pairs of coefficients of wavelets 306, 308 can also be encoded by quantizing the relative positions of wavelets 306, 308 on grid 304. For example, the coefficient encoder component 202 can encode a pair of wavelet coefficients by encoding the quantized positions of the wavelet coefficients relative to one another. By way of example, but not limitation, the wavelet coefficients can be a selected distance from one another, and such distance can be quantized and encoded as the relative position of the wavelet coefficients.

Accordingly, in some embodiments, instead of determining the individual absolute position of the wavelet coefficients, the relative position of a pair (or group) of wavelet coefficients can be determined and quantized. The relative positions of the pair or group of wavelet coefficients can be substantially constant before and after cropping of media and thus, in some embodiments, the resultant fingerprint generated can be crop-invariant.

Turning back to FIG. 2, the aggregation component 204 can aggregate the encoded information. For example, in embodiments wherein the coefficients are encoded (or mapped) to a tuple of integers, the aggregation component 204 can aggregate the tuple of integers to which the encoded coefficients are mapped.

The aggregation component 204 can aggregate the tuple of integers for a selected time interval (e.g., 3 seconds). For example, tuples of integers can represent coefficients for different points in time within the frame of media. The aggregation component can aggregate the tuples corresponding to a first time interval, and separately aggregate tuples for a second time interval. In various embodiments, different points in time within the frame can be evaluated. For example, the time period covered by the frame can be separated into two subperiods of time. Each subperiod of time can be evaluated in various embodiments. While the frame has been described as being evaluated as two subperiods within the period of time covered by the frame, in other embodiments, any number of subperiods can be determined (and corresponding evaluation and determination of tuples can be identified) within a single frame.

The aggregation component 204 can also record a count of the tuples for the different time intervals.

In some embodiments, the aggregation component 204 can also specify whether any of the integers within the tuples of integers occurred in a selected portion of the time interval associated with the tuple of integers. For example, the aggregation component 204 can specify whether any of the integers occurred in a first portion of the time interval associated with the tuple of integers or whether any of the integers occurred in a second portion of the time interval associated with the tuple of integers. In some embodiments, the first portion of the time interval can be the first half of the time interval and the second portion can be the second half of the time interval.

In some embodiments, the coefficient encoder component 202 can add a time tuple to one or more of the tuples of integers. The time tuple can include an indication of whether the corresponding integer value occurred in a first portion of the time interval or in a second portion of the time interval associated with the tuple of integers.

The WSG component 206 can generate a weighted set of the tuples of integers. The weighted set of the tuples of integers can include the tuples of integers weighted by the count of the tuples, for example.

In various embodiments, the tuples of integers can be weighted by other factors including, but not limited to, the scale of the one or more wavelets and/or the magnitude of the one or more wavelets.

In some embodiments, the tuples of the integers can be weighted according to a function of the rank of the magnitude (e.g. the largest magnitude can be assigned a value of 1 while the second largest magnitude can be assigned a value of 0.9). As the magnitude decreases the tuples of the integers can be weighted by a correspondingly decreasing value.

The hash generation component 208 can generate a hash based, at least, on the weighted set of the tuples of integers. In some embodiments, the hash can be generated based on the Weighted minhash function. Minhash (min-wise independent permutations locality sensitive hashing) is a technique for quickly estimating the similarity between two sets. One weighted minhash that can be employed, Weighted Minhash, can generalize the min-wise permutation hashes of Broder (see e.g., Broder et al., "Min-wise independent permutations," J. Comput. Syst. Sci., vol. 60, no. 3, pp. 630-659, 2000) from binary to real weights. (See Sergey Ioffe, "Improved Consistent Sampling, Weighted Minhash and L1 Sketching," IEEE ICDM, 2010.)

With reference to FIGS. 1 and 2, in some embodiments, the MFC 106 can generate the fingerprint for the media 114 based on the hash.

The retrieval component 210 can retrieve media based, at least, on the fingerprint generated for the media 114. For example, the retrieval component 210 can retrieve stored media based on a fingerprint generated for media 114. The stored media can be determined to be a duplicate in some embodiments. For example, if the fingerprinted media includes a fingerprint that is identical or substantially identical to a fingerprint of previously-stored media, the previously-stored media is determined to be a duplicate (or near duplicate) of the media for which the fingerprint was recently generated.

The deduping component 212 can dedupe media based, at least, on the fingerprint of the media. The deduping component 212 can dedupe media by comparing the frame of media with the fingerprint to previously-stored media. If the frame of media that is fingerprinted is deemed to be a duplicate of the previously-stored media, a reference can be made to the frame of media by the deduping component 212 (in lieu of storing the frame). If the frame of media is not deemed a duplicate of the previously-stored media, the deduping component 212 can generate a signal for the frame of media to be stored.

Microprocessor 214 can perform one or more of the functions described in this disclosure with reference to any of the systems and/or methods disclosed.

The memory 216 can be a computer-readable storage medium storing computer-executable instructions and/or information for performing the functions described in this disclosure with reference to any of the systems and/or methods disclosed. For example, as shown, memory 216 can store computer-executable instructions in some embodiments, for performing the functions of the fingerprint generation component 112'.

FIGS. 4A, 4B, 5A, 5B and 6 are illustrations of exemplary flow diagrams of methods that facilitate crop-invariant video fingerprinting using wavelet transforms in accordance with embodiments described herein.

Figure 4A:
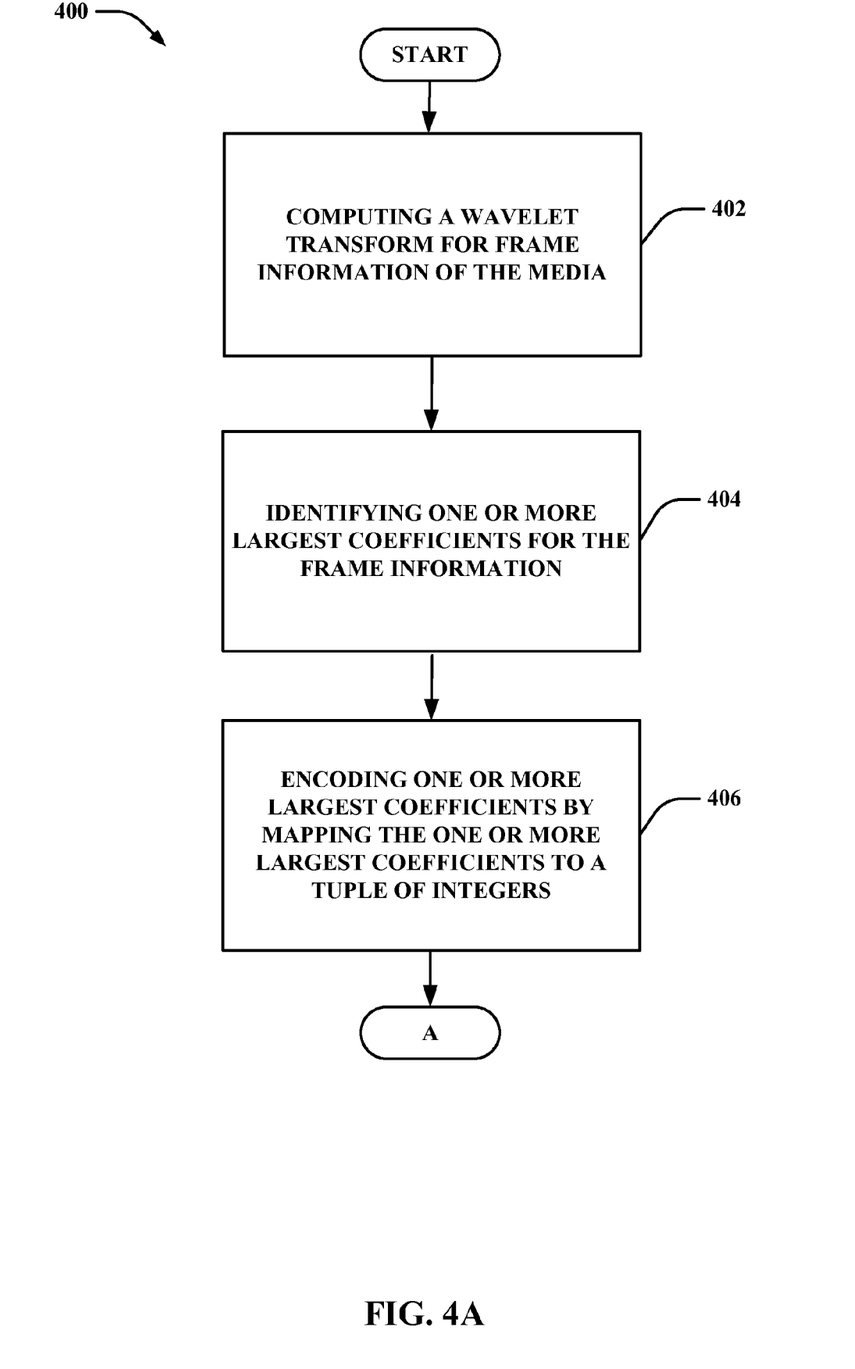
FIGS. 4A, 4B, 5A, 5B and 6 are illustrations of exemplary flow diagrams of methods that facilitate crop-invariant video fingerprinting using wavelet transforms in accordance with embodiments described herein.
Figure 4B:
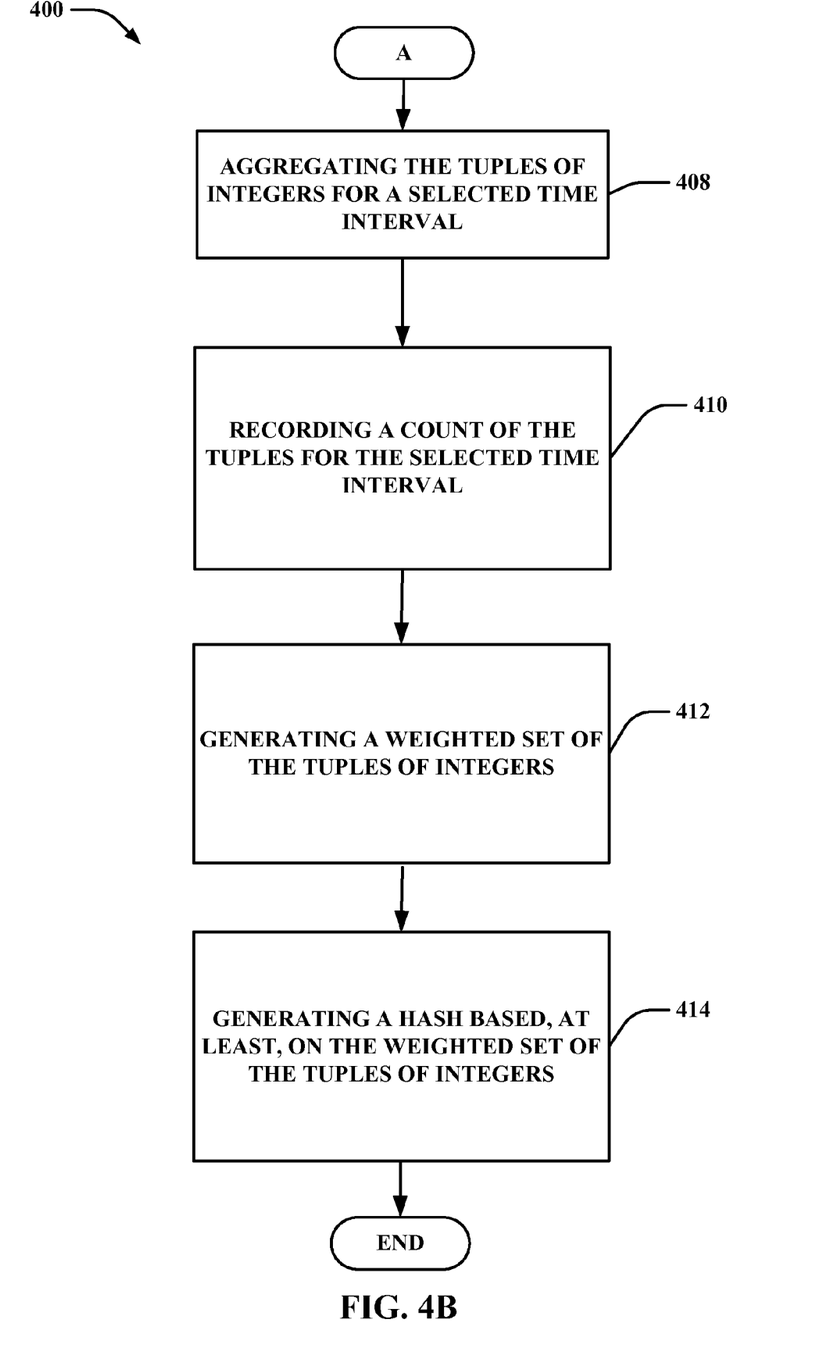

Specifically, FIGS. 4A and 4B can illustrate a method facilitating generating crop-invariant fingerprints based on encoding individual wavelet coefficients. At 402, method 400 can include computing a wavelet transform for frame information of the media (e.g., using the WTG component 200). In various embodiments, the media can include, but is not limited to, an image, video and/or audio. The frame information can include information associated with a frame of the media or information associated with an average of two or more frames of the media.

At 404, method 400 can include identifying one or more largest coefficients for the frame information (e.g., using the coefficient encoder component 202).

At 406, method 400 can include encoding one or more largest coefficients by mapping the one or more largest coefficients to a tuple of integers (e.g., using the coefficient encoder component 202). In some embodiments, the integers can represent one or more of a quantized x value, a quantized y value, a quantized sign value (e.g. +1 or −1), an x scale value and/or a y scale value.

In some embodiments, the encoding can include also encoding relative positions of pairs of the wavelet transforms generated by the wavelet transform generation component.

Encoding can include adding information specifying whether any of the tuples of integers occurred in a first time period of a time interval or a second time period of the time interval. For example, the first time period can be a first half of the time interval, and a second time period can be a second half of the time interval.

At 408, method 400 can include aggregating the tuples of integers for a selected time interval (e.g., using the aggregation component 204). At 410, method 400 can include recording a count of the tuples for the selected time interval (e.g., using the aggregation component 204).

At 412, method 400 can include generating a weighted set of the tuples of integers (e.g, using the WSG component 206). The weighted set of the tuples of integers can include the tuples of integers weighted by the count of the tuples, scales (or magnitudes) associated with the one or more largest coefficients and/or a rank of the one or more largest coefficients.

At 414, method 400 can include generating a hash based, at least, on the weighted set of the tuples of integers (e.g., using the hash generation component 208).

Although not shown, method 400 can also include generating a fingerprint for the media based, at least, on the hash (e.g., using the FGC 112' or FGC 112).

Figure 5A:
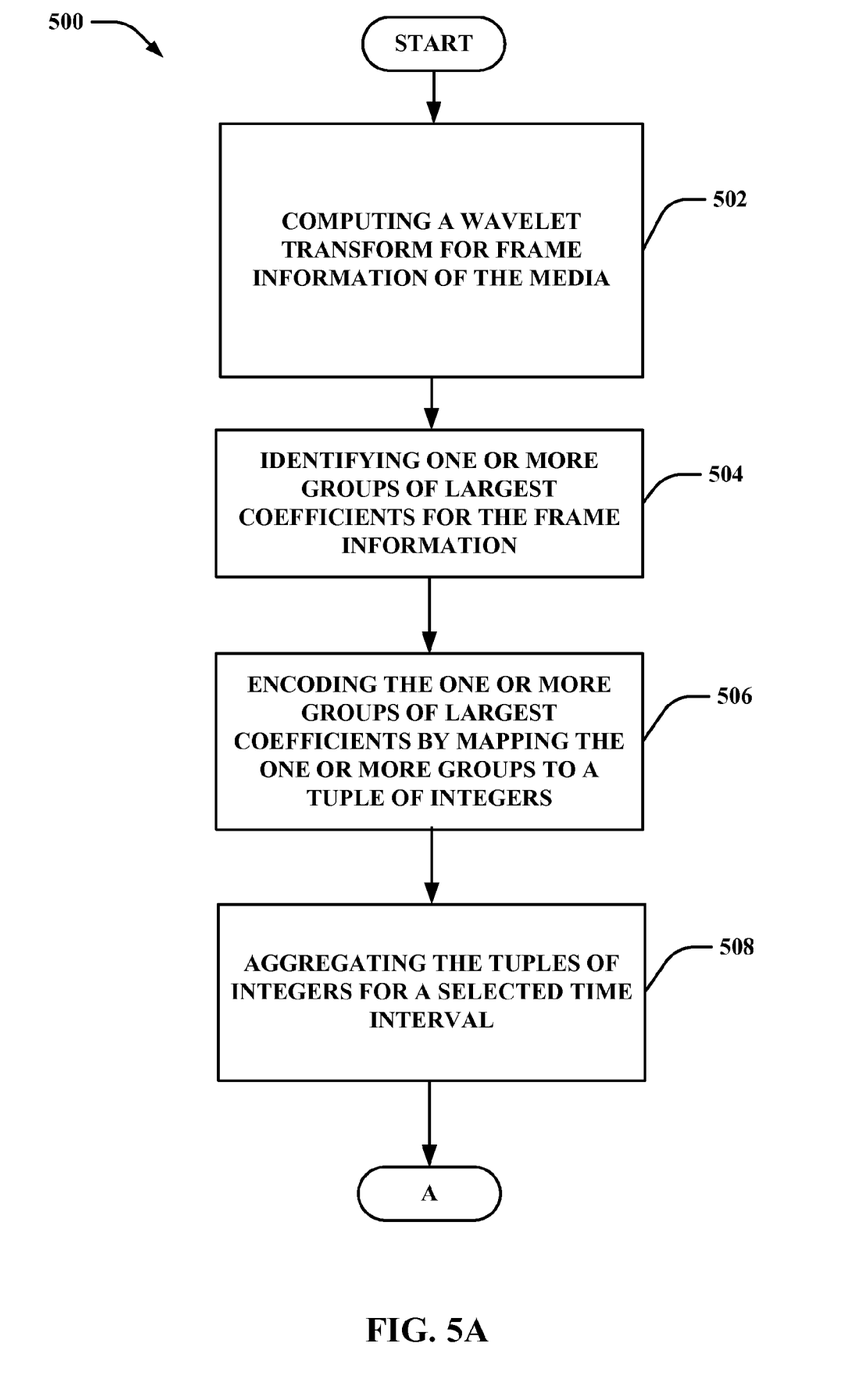
Figure 5B:
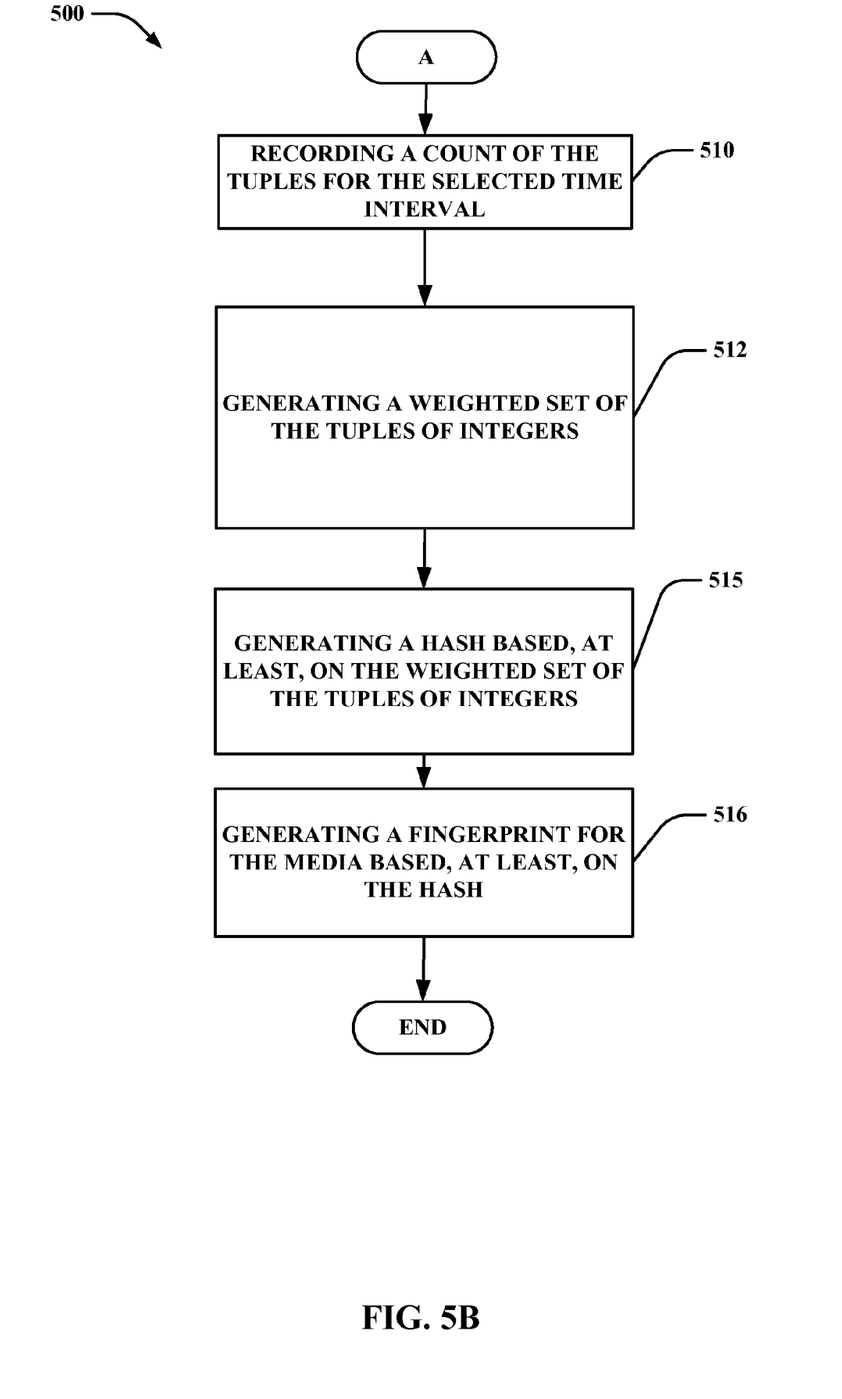

FIGS. 5A and 5B can illustrate a method facilitating generating crop-invariant fingerprints based on encoding groups of wavelet coefficients. At 502, method 500 can include computing a wavelet transform for frame information of the media (e.g., using the WTG component 200).

At 504, method 500 can include identifying one or more groups of largest coefficients for the frame information (e.g., using the coefficient encoder component 202).

At 506, method 500 can include encoding the one or more groups of largest coefficients by mapping the one or more groups to a tuple of integers (e.g., using the coefficient encoder component 202).

At 508, method 500 can include aggregating the tuples of integers for a selected time interval (e.g., using the aggregation component 204). At 510, method 500 can include recording a count of the tuples for the selected time interval (e.g., using the aggregation component 204).

At 512, method 500 can include generating a weighted set of the tuples of integers (e.g., using the WSG component 206). The weighted set of the tuples of integers can include the tuples of integers weighted by the count of the tuples, scales (or magnitudes) associated with the one or more largest coefficients and/or a rank of the one or more largest coefficients.

At 514, method 500 can include generating a hash based, at least, on the weighted set of the tuples of integers (e.g., using the hash generation component 208).

At 516, method 500 can include generating a fingerprint for the media based, at least, on the hash (e.g., using the FGC 112' or FGC 112). In one implementation, generating a fingerprint based on the hash includes assigning the hash to be the fingerprint.

Figure 6:
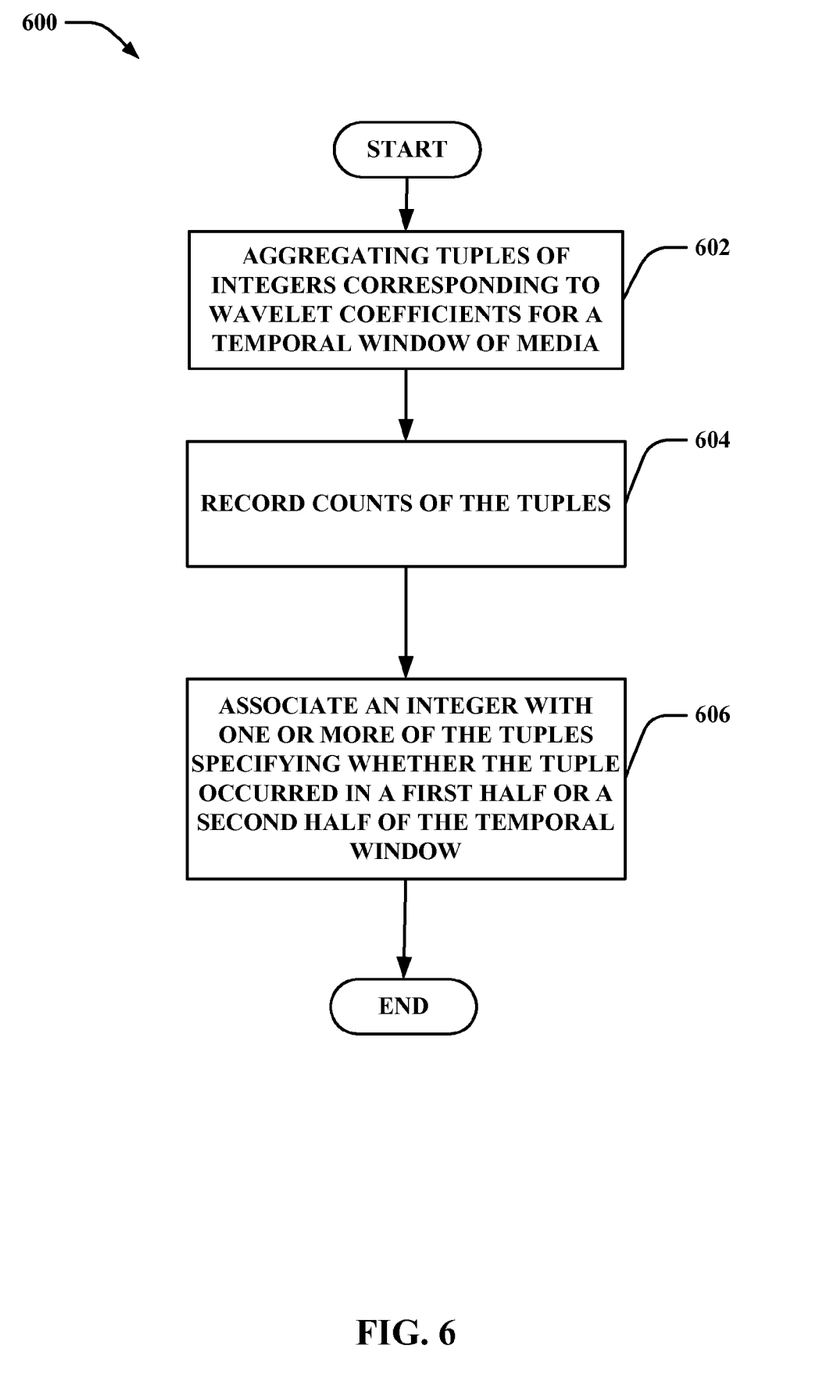

Turning now to FIG. 6, at 602, method 600 can include aggregating tuples of integers corresponding to wavelet coefficients for a temporal window of media (e.g., using the aggregation component 204). At 604, method 600 can include recording counts of the tuples (e.g., using the aggregation component 204). At 606, method 600 can include associating an integer with each of the tuples specifying whether the tuple occurred in a first half or a second half of the temporal window (e.g., using the encoder coefficient component 202).

Exemplary Networked and Distributed Environments

One of ordinary skill in the art can appreciate that the various embodiments described in this disclosure can be implemented in connection with any computer or other client or server device, which can be deployed as part of a computer network or in a distributed computing environment, and can be connected to any kind of data store where media may be found. In this regard, the various embodiments described in this disclosure can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services can also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the various embodiments of this disclosure.

Figure 7:
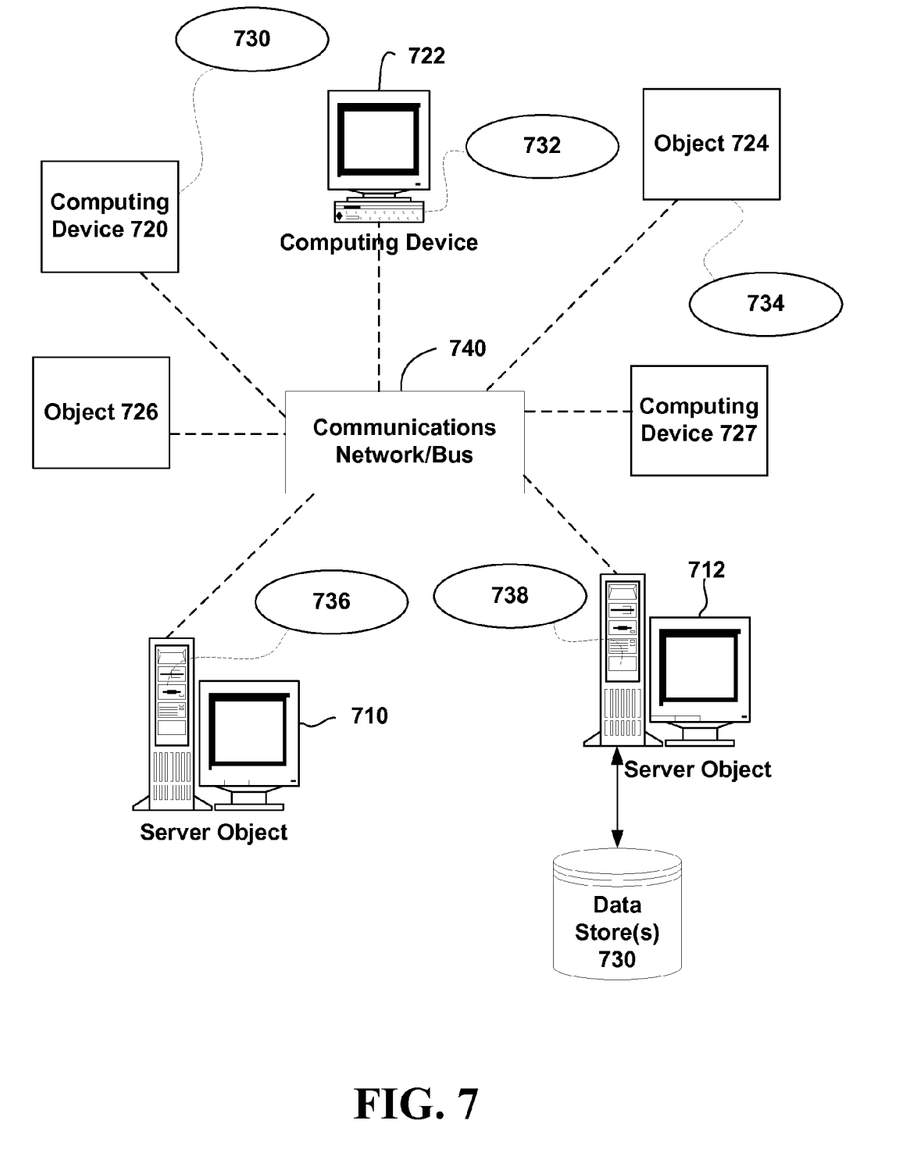
FIG. 7 is an illustration of a schematic diagram of an exemplary networked or distributed computing environment for implementing one or more embodiments described in this disclosure.

FIG. 7 provides a schematic diagram of an exemplary networked or distributed computing environment in which embodiments described in this disclosure can be implemented. The distributed computing environment includes computing objects 710, 712, etc. and computing objects or devices 720, 722, 724, 726, 728, etc., which can include programs, methods, data stores, programmable logic, etc., as represented by applications 730, 732, 734, 736, 738. It can be appreciated that computing objects 710, 712, etc. and computing objects or devices 720, 722, 724, 726, 728, etc. can include different devices, such as personal digital assistants (PDAs), audio/video devices, mobile phones, MPEG-1 Audio Layer 3 (MP3) players, personal computers, laptops, tablets, etc.

Each computing object 710, 712, etc. and computing objects or devices 720, 722, 724, 726, 728, etc. can communicate with one or more other computing objects 710, 712, etc. and computing objects or devices 720, 722, 724, 726, 728, etc. by way of the communications network 740, either directly or indirectly. Even though illustrated as a single element in FIG. 7, network 740 can include other computing objects and computing devices that provide services to the system of FIG. 7, and/or can represent multiple interconnected networks, which are not shown. Each computing object 710, 712, etc. or computing objects or devices 720, 722, 724, 726, 728, etc. can also contain an application, such as applications 730, 732, 734, 736, 738, that might make use of an application programming interface (API), or other object, software, firmware and/or hardware, suitable for communication with or implementation of the various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems as described in various embodiments.

Thus, a host of network topologies and network infrastructures, such as client/server, peer-to-peer, or hybrid architectures, can be utilized. The client can be a member of a class or group that uses the services of another class or group. A client can be a computer process, e.g., roughly a set of instructions or tasks, that requests a service provided by another program or process. A client can utilize the requested service without having to know all working details about the other program or the service itself.

As used in this application, the terms "component," "module," "system," and the like are intended to refer to a computer-related entity, either hardware, software, firmware, a combination of hardware and software, software and/or software in execution. For example, a component can be, but is not limited to being, a process running on a processor, a processor, an object, an executable, a thread of execution, a program, and/or a computer. By way of illustration, both an application running on a computing device and/or the computing device can be a component. One or more components can reside within a process and/or thread of execution and a component can be localized on one computer and/or distributed between two or more computers. In addition, these components can execute from various computer-readable storage media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

In a client/server architecture, particularly a networked system, a client can be a computer that accesses shared network resources provided by another computer, e.g., a server. In the illustration of FIG. 7, as a non-limiting example, computing objects or devices 720, 722, 724, 726, 728, etc. can be thought of as clients and computing objects 710, 712, etc. can be thought of as servers where computing objects 710, 712, etc. provide data services, such as receiving data from client computing objects or devices 720, 722, 724, 726, 728, etc., storing of data, processing of data, transmitting data to client computing objects or devices 720, 722, 724, 726, 728, etc., although any computer can be considered a client, a server, or both, depending on the circumstances. Any of these computing devices can process data, or request transaction services or tasks that can implicate the techniques for systems as described in this disclosure for one or more embodiments.

A server can be typically a remote computer system accessible over a remote or local network, such as the Internet or wireless network infrastructures. The client process can be active in a first computer system, and the server process can be active in a second computer system, communicating with one another over a communications medium, thus providing distributed functionality and allowing multiple clients to take advantage of the information-gathering capabilities of the server. Any software objects utilized pursuant to the techniques described in this disclosure can be provided standalone, or distributed across multiple computing devices or objects.

In a network environment in which the communications network/bus 740 can be the Internet, for example, the computing objects 710, 712, etc. can be Web servers, file servers, media servers, etc. with which the client computing objects or devices 720, 722, 724, 726, 728, etc. communicate via any of a number of known protocols, such as the hypertext transfer protocol (HTTP). Objects 710, 712, etc. can also serve as client computing objects or devices 720, 722, 724, 726, 728, etc., as can be characteristic of a distributed computing environment.

Exemplary Computing Device

Figure 8:
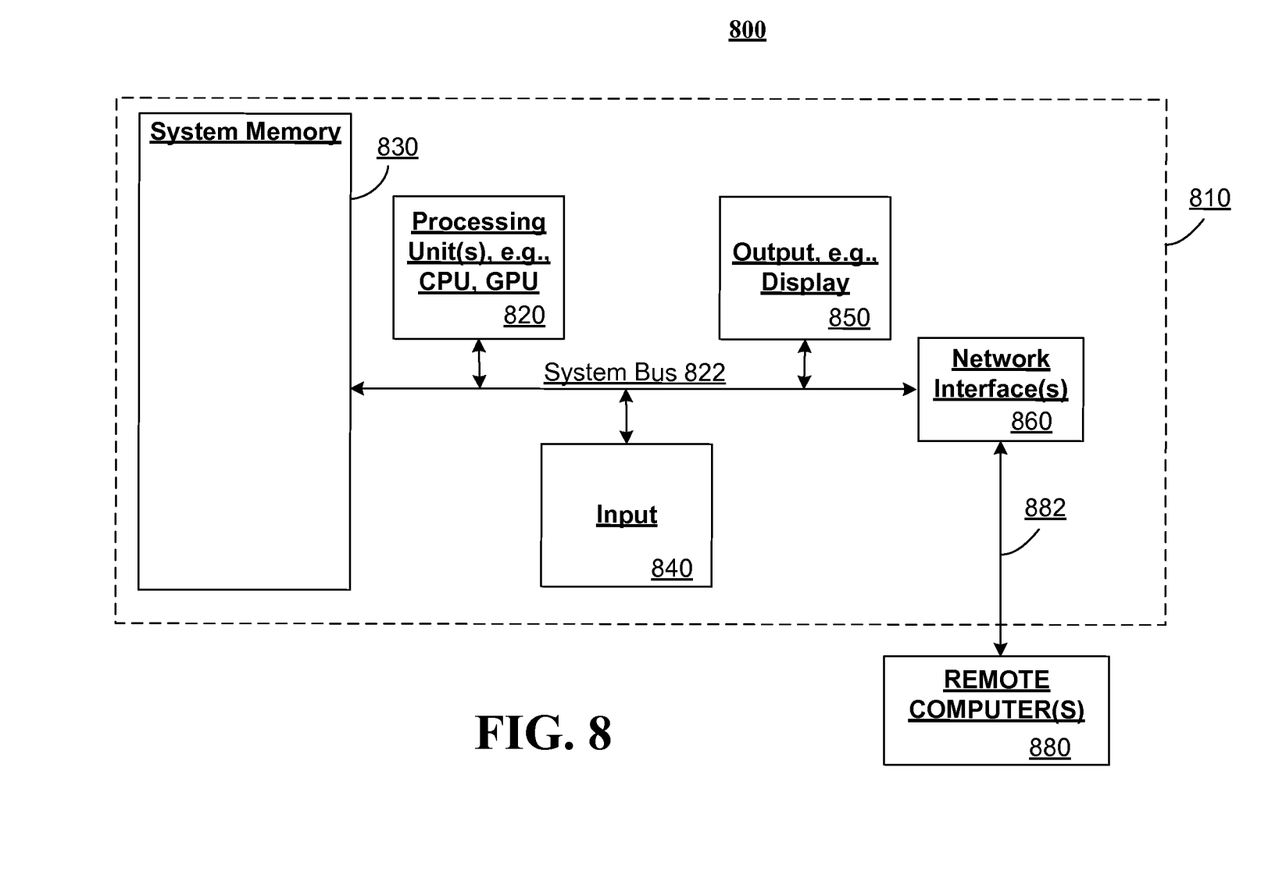
FIG. 8 is an illustration of a schematic diagram of an exemplary computing environment for implementing one or more embodiments described in this disclosure.

As mentioned, advantageously, the techniques described in this disclosure can be applied to any suitable device. It is to be understood, therefore, that handheld, portable and other computing devices and computing objects of all kinds are contemplated for use in connection with the various embodiments, i.e., anywhere that a device may wish to read or write transactions from or to a data store. Accordingly, the below remote computer described below in FIG. 8 is but one example of a computing device. Additionally, a suitable server can include one or more aspects of the below computer, such as a media server or other media management server components.

Although not required, embodiments can be partly implemented via an operating system, for use by a developer of services for a device or object, and/or included within application software that operates to perform one or more functional aspects of the various embodiments described in this disclosure. Software can be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

FIG. 8 thus illustrates an example of a suitable computing system environment 800 in which one or aspects of the embodiments described in this disclosure can be implemented, although as made clear above, the computing system environment 800 is only one example of a suitable computing environment and is not intended to suggest any limitation as to scope of use or functionality. Neither is the computing environment 800 to be interpreted as having any dependency or requirement relating to any one or combination of components illustrated in the exemplary computing environment 800.

With reference to FIG. 8, an exemplary computing environment 800 for implementing one or more embodiments includes a computing device in the form of a computer 810 is provided. Components of computer 810 can include, but are not limited to, a processing unit 820, a system memory 830, and a system bus 822 that couples various system components including the system memory to the processing unit 820.

Computer 810 typically includes a variety of computer readable media and can be any available media that can be accessed by computer 810. The system memory 830 can include computer storage media in the form of volatile and/or nonvolatile memory such as read only memory (ROM) and/or random access memory (RAM). By way of example, and not limitation, memory 830 can also include an operating system, application programs, other program modules, and program data.

A user can enter commands and information into the computer 810 through input devices 840, non-limiting examples of which can include a keyboard, keypad, a pointing device, a mouse, stylus, touchpad, touch screen, trackball, motion detector, camera, microphone, joystick, game pad, scanner, video camera or any other device that allows the user to interact with the computer 810. A monitor or other type of display device can be also connected to the system bus 822 via an interface, such as output interface 850. In addition to a monitor, computers can also include other peripheral output devices such as speakers and a printer, which can be connected through output interface 850.

The computer 810 can operate in a networked or distributed environment using logical connections to one or more other remote computers, such as remote computer 880. The remote computer 880 can be a personal computer, a server, a router, a network PC, a peer device or other common network node, or any other remote media consumption or transmission device, and can include any or all of the elements described above relative to the computer 810. The logical connections depicted in FIG. 8 include a network 882, such local area network (LAN) or a wide area network (WAN), but can also include other networks/buses e.g., cellular networks.

As mentioned above, while exemplary embodiments have been described in connection with various computing devices and network architectures, the underlying concepts can be applied to any network system and any computing device or system in which it is desirable to publish or consume media in a flexible way.

Also, there are multiple ways to implement the same or similar functionality, e.g., an appropriate API, tool kit, driver code, operating system, control, standalone or downloadable software object, etc. which enables applications and services to take advantage of the techniques detailed herein. Thus, embodiments herein are contemplated from the standpoint of an API (or other software object), as well as from a software or hardware object that implements one or more aspects described in this disclosure. Thus, various embodiments described in this disclosure can have aspects that are wholly in hardware, partly in hardware and partly in software, as well as in software.

Computing devices typically include a variety of media, which can include computer-readable storage media and/or communications media, in which these two terms are used herein differently from one another as follows. Computer-readable storage media can be any available storage media that can be accessed by the computer, can be typically of a non-transitory nature, and can include both volatile and non-volatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, electrically erasable programmable read only memory (EEPROM), flash memory or other memory technology, compact disc read only memory (CD-ROM), digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, radio frequency (RF), infrared and other wireless media.

It is to be understood that the embodiments described in this disclosure can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors and/or other electronic units designed to perform the functions described in this disclosure, or a combination thereof.

When the embodiments are implemented in software, firmware, middleware or microcode, program code or code segments, they can be stored in a machine-readable medium (or a computer-readable storage medium), such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described in this disclosure can be implemented with modules or components (e.g., procedures, functions, and so on) that perform the functions described in this disclosure. The software codes can be stored in memory units and executed by processors. A memory unit can be implemented within the processor or external to the processor, in which case it can be communicatively coupled to the processor via various structures.

The word "exemplary" is used herein to mean serving as an example, instance, or illustration. For the avoidance of doubt, the subject matter disclosed herein is not limited by such examples. In addition, any aspect or design described in this disclosure as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

What has been described above includes examples of one or more embodiments. It is, of course, not possible to describe every conceivable combination of components or methodologies for purposes of describing the aforementioned embodiments, but one of ordinary skill in the art can recognize that many further combinations and permutations of various embodiments are possible. Accordingly, the described embodiments are intended to embrace all such alterations, modifications and variations that fall within the spirit and scope of the appended claims. Moreover, use of the term "an embodiment" or "one embodiment" throughout is not intended to mean the same embodiment unless specifically described as such. Further, use of the term "plurality" can mean two or more.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components can be combined into a single component providing aggregate functionality or divided into several separate sub-components, and that any one or more middle layers, such as a management layer, can be provided to communicatively couple to such sub-components in order to provide integrated functionality. Any components described in this disclosure can also interact with one or more other components not specifically described in this disclosure but generally known by those of skill in the art.

In view of the exemplary systems described above methodologies that can be implemented in accordance with the described subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks can occur in different orders and/or concurrently with other blocks from what is depicted and described in this disclosure. Where non-sequential, or branched, flow is illustrated via flowchart, it can be appreciated that various other branches, flow paths, and orders of the blocks, can be implemented which achieve the same or a similar result. Moreover, not all illustrated blocks can be required to implement the methodologies described in this disclosure after.

In addition to the various embodiments described in this disclosure, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described in this disclosure, and similarly, storage can be provided across a plurality of devices. The invention is not to be limited to any single embodiment, but rather can be construed in breadth, spirit and scope in accordance with the appended claims.

What is claimed is:

1. A system that facilitates fingerprinting of media, comprising:
 a memory that stores computer executable components; and
 a microprocessor that executes the following computer executable components stored in the memory:
  a communication component that receives the media; and a media fingerprinting component that fingerprints the media, the media fingerprinting component employing a fingerprint generation component stored in the memory and comprising:
  a wavelet transform generation component that:
    computes a first wavelet transform for frame information of the media; and
    identifies one or more largest coefficients for the frame information;
  a coefficient encoder component that encodes one or more largest coefficients, wherein encoding comprises encoding the one or more largest coefficients by mapping the one or more largest coefficients to a tuple of integers;
  an aggregation component that, for a selected time interval of a plurality of time intervals:
    aggregates the tuples of integers; and
    records a count of the tuples;
  a weighted set generation component that generates a weighted set of the tuples of integers; and
  a hash generation component that generates a hash based, at least, on the weighted set of the tuples of integers.

2. The system of claim 1, wherein the frame information comprises at least one of information associated with a frame or information associated with an average of two or more frames.

3. The system of claim 1, wherein the first wavelet transform is a haar wavelet transform.

4. The system of claim 1, wherein the first wavelet transform is an overcomplete wavelet transform.

5. The system of claim 1, wherein the wavelet transform is a three dimensional wavelet transform.

6. The system of claim 1, wherein the integers represent one or more of a quantized first value, a quantized second value, a sign value, a first scale value or a second scale value.

7. The system of claim 6, wherein the quantized first value and the quantized second value are associated with a position corresponding to a magnitude associated with the one or more largest coefficients.

8. The system of claim 1, wherein the coefficient encoder component also encodes relative positions of pairs of wavelet transforms generated by the wavelet transform generation component.

9. The system of claim 8, wherein the relative positions of pairs of wavelet transforms are substantially constant prior to and after a crop of one or more frames corresponding to the frame information.

10. The system of claim 1, wherein the aggregation component also specifies whether ones of the tuples of integers occurred in a first time period of the selected time interval of the plurality of time intervals or a second time period of the selected time interval of the plurality of time intervals.

11. The system of claim 10, wherein the first time period is a first half of the selected time interval and the second time period is a second half of the selected time interval.

12. The system of claim 10, wherein the coefficient encoder component also adds a time tuple to one or more of the tuples of integers, the time tuple including an indication of whether a one of the one or more of the tuples of integers occurred in the first time period of the time interval or the second time period of the time interval.

13. The system of claim 1, wherein the media fingerprinting component generates a fingerprint based, at least, on the hash.

14. The system of claim 1, wherein the media is an image or video.

15. The system of claim 14, wherein the media is a cropped version of the image or the video.

16. The system of claim 1, wherein the weighted set of the tuples of integers comprises the tuples of integers weighted by the count of the tuples.

17. A method, comprising:
employing a microprocessor to execute computer executable components stored within a memory to perform the following:
  computing a wavelet transform for frame information of the media;
  identifying one or more largest coefficients for the frame information;
  encoding one or more largest coefficients by mapping the one or more largest coefficients to a tuple of integers;
  aggregating the tuples of integers for a selected time interval;
  recording a count of the tuples for the selected time interval;
  generating a weighted set of the tuples of integers; and
  generating a hash based, at least, on the weighted set of the tuples of integers.

18. The method of claim 17, wherein the generating the weighted set of the tuples of integers comprises weighing the tuples of the integers by the count of the tuples.

19. The method of claim 17, wherein the generating the weighted set of the tuples of integers comprises weighing the tuples of integers by one or more scales associated with the one or more largest coefficients.

20. The method of claim 17, wherein the generating the weighted set of the tuples of integers comprises weighing the tuples of integers by one or more magnitude of the one or more largest coefficients.

21. The method of claim 17, wherein the generating the weighted set of the tuples of integers comprises weighing the tuples of integers by a value that is a function of a rank of the magnitude of the one or more largest coefficients.

22. The method of claim 17, wherein the frame information comprises at least one of information associated with a frame or information associated with an average of two or more frames.

23. The method of claim 17, wherein the integers represent one or more of a quantized first value, a quantized second value, a sign value, a first scale value or a second scale value.

24. The method of claim 17, wherein the encoding further comprises encoding relative positions of pairs of wavelet transforms generated by the wavelet transform generation component.

25. The method of claim 17, further comprising specifying whether ones of the tuples of integers occurred in a first time period of the time interval or a second time period of the time interval.

26. The method of claim 17, further comprising generating a fingerprint for the media based, at least, on the hash.

27. The method of claim 26, further comprising retrieving another media based, at least, on the fingerprint.

28. The method of claim 26, further comprising deduping stored media based, at least, on the fingerprint.

29. The method of claim 17, wherein the media is cropped.

30. The method of claim 17,
  wherein identifying one or more largest coefficients for the frame information comprises identifying one or more groups of largest coefficients for the frame information, and
  wherein encoding one or more largest coefficients by mapping the one or more largest coefficients to a tuple of integers comprises encoding the one or more groups of largest coefficients by mapping the one or more groups to a tuple of integers.

31. A system that facilitates fingerprinting of media, comprising:
- a memory that stores computer executable components; and
- a microprocessor that executes the following computer executable components stored in the memory:
  - a fingerprint generation component stored in the memory and comprising:
    - a wavelet transform generation component that:
      - computes one or more wavelet transforms for frame information associated with media;
      - identifies a plurality of coefficients for the one or more wavelet transforms;
    - a coefficient encoder component that encodes information associated with the plurality of coefficients, wherein encoding comprises mapping the plurality of coefficients to a tuple of information; and
    - a hash generation component that generates a hash based, at least, on the tuple of information.

32. The system of claim 31, wherein the tuple of information comprises quantized values indicative of a position represented by the plurality of coefficients.

33. The system of claim 31, wherein the plurality of wavelet transforms comprises a pair of wavelet transforms and the tuple of information comprises quantized values indicative of relative positions of the pair of wavelet transforms.

* * * * *